(12) United States Patent
Kunzel et al.

(10) Patent No.: US 6,890,666 B2
(45) Date of Patent: May 10, 2005

(54) VAPOR BARRIER FOR USE IN THE HEAT INSULATION OF BUILDINGS

(75) Inventors: Hartwig Kunzel, Valley (DE); Theo Grosskinsky, Holzkirchen (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/617,673

(22) Filed: Jul. 14, 2003

(65) Prior Publication Data

US 2004/0103607 A1 Jun. 3, 2004

Related U.S. Application Data

(63) Continuation of application No. 09/521,125, filed on Mar. 7, 2000, which is a continuation-in-part of application No. 08/945,146, filed as application No. PCT/DE96/00705 on Apr. 18, 1996, now abandoned.

(30) Foreign Application Priority Data

Apr. 19, 1995 (DE) .......................................... 195 14 420

(51) Int. Cl.$^7$ .............................................. B32B 21/06
(52) U.S. Cl. ................... 428/536; 428/537.5; 52/309.4; 52/309.12
(58) Field of Search .............................. 428/537.5, 536; 52/309.4, 309.12

(56) References Cited

U.S. PATENT DOCUMENTS

| | | |
|---|---|---|
| 3,297,518 A | 1/1967 | Maschner et al. |
| 3,445,322 A | 5/1969 | Saila et al. |
| 3,632,372 A | 1/1972 | Heslop et al. |
| 3,908,079 A | 9/1975 | Marzolf et al. |

(Continued)

FOREIGN PATENT DOCUMENTS

| | | |
|---|---|---|
| DE | 1886678 | 10/1963 |
| DE | 1886679 | 10/1963 |
| DE | 3235246 | 3/1984 |
| DE | 3423766 | 1/1986 |

(Continued)

OTHER PUBLICATIONS

Lothar Moll, "The significance of the wind seal and air seal for thermal insulation", Gesunder Wohnen [Healthy Living], vol. 22, Jun./Jul. 1993, pp. 3–18.

Deutsche Norm, "Thermal insulation in buildings, Characteristic values relating to thermal insulation and protection against moisture", Dec. 1985, pp. 1–18.

Din 4108 Part 5, Aug., 1991, pp. 2–16.

Beuth Veriag GmbH, "Translations of DIN–Standards", Aug. 2001, pp. 1–11.

Deutsche Norm, "Determination of water vapor (moisture) permeability of construction and insulating materials", Nov. 1987, pp. 1–5.

"Nomenclature and Properties, Durethan", Bayer Engineering Thermoplastics, Edition Feb. 2, 1994, pp. 2–10.

(Continued)

Primary Examiner—Leszek Kiliman
(74) Attorney, Agent, or Firm—Oblon, Spivak, McClelland, Maier & Neustadt, P.C.

(57) ABSTRACT

The invention relates to a vapor barrier for use in cthe thermal insulation of buildings which can be used, in particular, for thermal insulation procedures in new buildings or in the renovation of old buildings. The vapor barrier in accordance with the invention is thereby capable of achieving water vapor exchange under different ambient conditions. This is achieved by using a material which has a water vapor diffusion resistance which is dependent on the ambient humidity and which also has adequate tensile strength and tear resistance.

77 Claims, 2 Drawing Sheets

U.S. PATENT DOCUMENTS

| | | | | |
|---|---|---|---|---|
| 4,282,697 | A | * | 8/1981 | Spielau et al. ............ 52/746.11 |
| 4,288,956 | A | * | 9/1981 | Heck ...................... 52/309.12 |
| 4,318,258 | A | * | 3/1982 | Heck ...................... 52/309.12 |
| 4,368,604 | A | * | 1/1983 | Spielau et al. ............. 52/309.8 |
| 4,542,057 | A | * | 9/1985 | Breitscheidel et al. ...... 428/126 |
| 4,597,817 | A | * | 7/1986 | Larsen ....................... 156/280 |
| 4,630,421 | A | * | 12/1986 | Diehl et al. ................... 52/408 |
| 5,236,754 | A | | 8/1993 | McBride et al. |
| 5,370,757 | A | | 12/1994 | Corbin et al. |
| 5,389,311 | A | * | 2/1995 | Hetzel ........................ 261/104 |
| 5,561,958 | A | | 10/1996 | Clement et al. |
| 6,258,890 | B1 | * | 7/2001 | Schmidt-Thuemmes et al. ......................... 524/555 |

FOREIGN PATENT DOCUMENTS

| | | |
|---|---|---|
| DE | 35 38 597 C2 | 5/1986 |
| DE | 3425795 | 7/1989 |
| DE | 0 410 275 | 1/1991 |
| DE | 93 08 678 U1 | 9/1993 |
| EP | 0 293 030 | 2/1982 |
| EP | 0 046 942 | 3/1982 |
| EP | 0 148 870 B1 | 7/1985 |
| EP | 0 167 714 | 1/1986 |
| EP | 0217717 | 4/1987 |
| EP | 0378015 | 7/1990 |
| EP | 0 167 714 A2 | 3/1994 |
| FR | 2 476 669 | 8/1981 |
| GB | 1 230 753 | 5/1971 |
| GB | 1598807 | 9/1981 |
| JP | 62074648 | 4/1987 |
| JP | 62-074648 | 4/1987 |
| JP | 63008448 | 1/1988 |
| WO | 85/00188 | 1/1985 |

OTHER PUBLICATIONS

"The water absorption and conditioning of moulded parts in Durethan", Bayer, Edition Oct. 10, 1996, pp. 5–19.

"Application Technology information, Durethan B 31 F", Bayer, Apr. 15, 1988, 5 pages.

"Thermal performance of the exterior envelopes of buildings VII", Conference Proceedings, American Society of Hearing, Refrigerating and Air–Conditioning Engineers, Inc. Dec. 6–10, 1998, 9 pages.

"Fundamentals", 2001 ASHRAE Handbook, Inch–Pound Edition, American Society of Hearing, Refrigeratin and Air–Conditioning Engineers, Inc. 2001, 6 pages.

Verkaufsunterlage B.I.–Natur Dampfbremspappe armiert der Firma Ökologische Bausysteme B.I. Moll GmbH & Co KG, herausgegeben 1994, Seite 1 (with computer generated English translation).

Untersuchungsbericht des Fraunhofer–Instituts vom 11. Aug. 1994 (with computer generated English translation).

DIN 53 122, Nov. 1974, Blatt 1, Seite 3/346 bis 349.

Wassertransport durch Diffusion in Feststoffen von H. Klopfer, Bauverlag GmbH, Wiesbaden und Berlin, Ausgabe 1974 (with computer generated English translation).

Wasserdampfdiffusion im Bauwesen, Ein Letfaden zur Verhütung von Bauschäden durch diffusionstechnisch einwandfreie Baukonstruktionen, von Dipl.–Ing. Karl Seiffert, Bauverlag GmbH, Wiesbaden und Berlin, Ausgabe 1974 (with computer generated English translation).

Bauphysikalische Entwurfslehre von Dr. Ing. Friedrich Eichler, VEB Verlag für Bauwesen, Berlin, Ausgabe 1968 (with computer generated English translation).

DIN–Norm 52 615, Nov. 1987, Seite 1 bis 4.

Prospekt „HYGRODIODE Die duoaktive Dampfbremse" der Fa. lcopal GmbH (with computer generated English translation) 07–98.

IBP–Mitteilung 268 des Fraunhofer–Instituts für Bauphysik: "Feuchteadaptive Dampfbremse für Gebäudedämmungen", (22) 1995 (with computer generated English translation).

Wasseraufnahme und Konditionierung von Formteilen aus Durethan, Produktinformation der Firma Bayer, Aug. 1995 (with computer generated English translation).

Fachartikel, "Geneigte Dächer ohne chemischen Holzschutz", von Horst Schulze, in wksb 27/1989 (with computer generated English translation).

Studies of the water–vapor transmission rate and the water proofness of various commercial polymer films Caplus, 1998 Host: STN International.

Polyvinyl Alcohol, Properties and Applications, ed. C.A. Finch 1973, Verlag John Wiley & Sons Ltd.

Vergleich des Verhaltens von PVA– und PA–Folien durch tabellarische Gegenüberstellung von P und kD; Umrechnungsformeln aus der Fachzeitschrift Bauphysik, Kapitel 2.3 "Umrechnung von Diffusionskenngrössen", Diagramm aus Fachartikel von Dr. H.M. Künzel (with computer generated English translation), 1973.

Prospekt Difunorm Vario, "Die feuchteadaptive Dampfbremsfolie" (with computer generated English translation), 1996.

Prospekt Sonderdruck aus Stuck–Putz–Trockenbau 55 (1997), Heft 2, Seite 34–37 "Die Folie denkt mit" (with computer generated English translation).

Eidesstattliche Erklärung von Herrn Moll (with computer generated English translation), 2001.

Eidesstattiche Erklärung von Herrn Dr. Lusky (with computer generated English translation), 2002.

Prüfprotokoll der "Materialforschungs– und Prüfungsanstalt Leipzig e.V." vom 9. Juni 1998 (with computer generated English translation).

* cited by examiner

VAPOR BARRIER FOR USE IN THE HEAT INSULATION OF BUILDINGS

CROSS-REFERENCES TO RELATED APPLICATIONS

This application is a Continuation of U.S. patent application Ser. No. 09/521,125 filed Mar. 7, 2000, which is a Continuation-in-part of U.S. patent application Ser. No. 08/945,146 filed Oct. 17, 1997, abandoned, which is the U.S. national phase of PCT/DE96/00705 filed Apr. 18, 1996, which claims priority to German patent application serial number 195 14 420.1 filed Apr. 19, 1995.

BACKGROUND OF THE INVENTION

The invention relates to a vapor barrier, which is arranged facing the room, for use in the thermal insulation of buildings, especially for thermal insulation procedures in new buildings and in the renovation of old buildings.

In order to reduce the carbon dioxide emission which occurs as a result of heating buildings, thermal insulation procedures are carried out in the construction of new buildings and in the renovation of old buildings. For economic reasons, which constantly have to be considered by the owner of the building, the question of cost also has to be taken into account here. Moreover, the external appearance of the building is a significant factor here which also represents a limit to what can actually be done. Thus, for example, thermal insulation procedures of this kind can be carried out only in buildings, which have a visible framework, by means of insulation layers which are located internally. An acceptable amount of moisture in the framework wood must also be ensured, especially under winter conditions, via the possible diffusion of vapor and also by the vapor barrier facing the room. In contrast to this, the moisture, which is due to rain and which penetrates through the joints between the wooden posts and the nogging, must also be able to dry out toward the inside in the summer months in order to ensure long life for the wood that is used in the framework despite the improved thermal insulation characteristics.

Similar difficulties also arise in subsequent full-rafter insulation on high-pitched roofs with a vapor-tight front covering, for example, roofing fabric on planking. Thus tests carried out by the Fraunhofer Institut für Bauphysik in the case where vapor barriers were applied inside with a water vapor diffusion resistance ($s_d$ value) which is less than a 10 m diffusion-equivalent air layer thickness, especially on roofs oriented toward the north, showed that the extent to which the planking dries out in the summer is not sufficient to achieve a wood moisture situation which is harmless. Thus vapor barriers which are applied facing the room can no longer adequately carry away moisture accumulations which are caused by convection, for example.

Proceeding from these known disadvantages, the problem for the invention is to create a vapor barrier which is arranged facing the room and which is capable—under different ambient conditions which are variable in use—of ensuring water vapor exchange between the room air and the interior of the building component which will, as extensively as possible, prevent damage by moisture to the building material that is used.

DISCLOSURE OF THE INVENTION

According to the invention, a vapor barrier for use in the insulation of buildings is formed from a material which has a water vapor diffusion resistance dependent on an ambient humidity. At a relative humidity of an atmosphere surrounding the vapor barrier in the region of 30% to 50%, the material has a water vapor diffusion resistance ($s_d$-value) of 2 to 5 meters diffusion-equivalent air space width. At a relative humidity in the region of 60% to 80%, the material has a water vapor diffusion resistance ($s_d$-value) which is <1 meter diffusion-equivalent air space width.

Illustratively according to the invention, the vapor barrier is a film-forming composition capable of being sprayed or painted onto the inner walls of a room to form a film on the inner surface of the walls.

Further illustratively according to the invention, at least a second portion of the vapor barrier is comprised of a carrier material.

Additionally illustratively according to the invention, the carrier material is selected from the group consisting of particle board, chip board, oriented strand board, plywood paneling, gypsum board (standard or fiber reinforced), fiber board, cement board, cementitious wood wool board, calcium silica board, fiber insulation batts or slabs, foam insulation slabs, wall paper, carpet and cloth.

Illustratively according to the invention, the material is a film.

Further illustratively according to the invention, the film has a thickness of 10 $\mu$m to 2 mm.

Additionally illustratively according to the invention, the film has a thickness of 20 $\mu$m to 100 $\mu$m.

Illustratively according to the invention, the material is applied as a coating to a carrier material. The carrier material is such that the characteristics of the vapor barrier are essentially provided by the coating.

Further illustratively according to the invention, the material is sandwiched between two layers of a carrier material. The carrier material is such that the characteristics of the vapor barrier are essentially provided by the coating.

Additionally illustratively according to the invention, the film is formed prior to application to an inner wall surface.

Illustratively according to the invention, the formed film has a decorative surface structure.

Further illustratively according to the invention, the formed film has a printed color pattern.

Additionally illustratively according to the invention, the film is chosen from polyamide 6, polyamide 4 or polyamide 3.

Illustratively according to the invention, the carrier material is a fiber reinforced cellulose material.

Further illustratively according to the invention, the material is a polymer coating applied to a carrier material.

Additionally illustratively according to the invention, a polymer for the polymer coating is selected from the group consisting of polyvinyl alcohol, dispersed synthetic resin, methyl cellulose, linseed oil alkyd resin, bone glue and protein derivatives.

BRIEF DESCRIPTION OF THE DRAWINGS

The invention may best be understood by referring to the following detailed description and accompanying drawings which illustrate the invention. In the drawings.

DESCRIPTIONS OF ILLUSTRATIVE EMBODIMENTS

Figure 1:
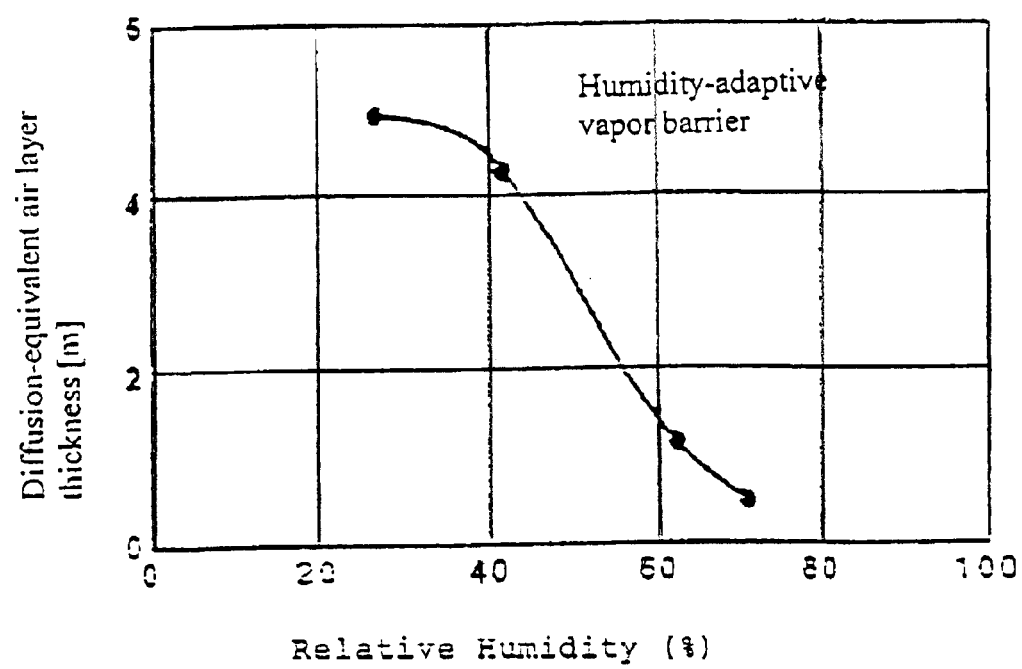
FIG. 1 illustrates the result for the diffusion-equivalent air layer thickness ($s_d$ value) of a vapor barrier constricted according to the invention as a function of the average relative humidity which prevailed during an experiment; and, FIG. 2 illustrates comparative humidity characteristics of inter-rafter insulation using a prior art vapor barrier and using a humidity-adaptive vapor barrier constructed according to the present invention.

The vapor barrier, which is applied facing the room in accordance with the invention and which can also be termed a "humidity-adaptive vapor barrier," uses as an essential material one that has a water vapor diffusion resistance which is dependent on the ambient humidity and which has sufficient tensile and compressive strength for use in buildings as they are being built.

In the case of a relative humidity in the range between 30% and 50% of the atmosphere surrounding the vapor barrier, the material used for the vapor barrier, in the form of a film or as a coating on a carrier material, should have a water vapor diffusion resistance value ($s_d$ value) of 2 to 5 m in terms of a diffusion-equivalent air layer thickness and a water vapor diffusion resistance ($s_d$ value) which is less than 1 m in terms of a diffusion-equivalent air layer thickness in the case of a relative humidity in the range from 60% to 80% as is typical for the summer months, for example.

This leads to a higher water vapor diffusion resistance being achieved under winter conditions than under summer conditions. In this way, the drying out process in the summer can be encouraged without the supply of moisture under winter conditions being able to assume a value which can impair the materials that are used and the building itself.

In addition to the applications that have already been mentioned in connection with the disadvantages of the prior art, the invention can also be used with metal roofs or timber post constructions and can also lead to a reduction in building costs here along with an improvement in thermal insulation.

It is possible to use, for example, polyamide 6, polyamide 4 or polyamide 3 as a material for the vapor barrier which has the desired properties. These are known, in particular, from K. BIEDERBICK's work "Kunststoffe—kurz und bündig", published by Vogel-Verlag, Würzburg. These polyamides are used as films and they inherently have the required characteristics in terms of water vapor diffusion resistance. Moreover, they have the strength values that are necessary for use in buildings and they can therefore be used at no additional cost. The thickness of the films can be in the region from 10 μm to 2 mm or, preferably, in the region from 20 μm to 100 μm.

In one embodiment, the vapor barrier comprises a film, which may be applied, for example, by painting, spraying, or the like, onto a wall in like manner to a paint, coating, or the like. For example, such a vapor barrier can be formed by painting or spraying a polyamide compound onto the inner walls of a room.

In another embodiment, the vapor barrier itself can comprise a wall paper, which can optionally be provided with a surface structure or print having a colored pattern. For example, such vapor barrier can be provided by using a polyamide film used like, and/or in place of, conventional wall paper previously known in the art.

Other materials can also be used which do not have adequate strength but which can be applied to suitable carrier materials. The carrier materials here preferably have a low water vapor diffusion resistance and the required characteristics of the vapor barrier in accordance with the invention are essentially produced by the coating.

Fiber reinforced cellulose materials, such as paper webs, membranes made from synthetic fiber spun fabrics or even perforated polyethylene films, may be used as materials for the carrier(s), for example. Other examples of suitable carrier materials for purposes of the present invention include particle board, chip board, oriented strand board, plywood paneling, gypsum board (standard or fiber reinforced), fiber board, cement board, cementitious wood wool board, calcium silica board, fiber insulation batts or slabs, foam insulation slabs, wall paper, carpet and cloth. The vapor retarding material itself may be applied to these carrier materials as film or membrane or as coating (via spraying, painting or other appropriate application methods).

The material can be present as a coating on a carrier material. The coating here can be applied to one side of the carrier material but, in special cases, it can also be accommodated between two layers of the carrier material in a sandwich-like manner. In the latter case, the coating material is effectively protected from both sides firm mechanical wear and it can therefore ensure the desired water vapor diffusion properties over an extended period of time. Several such layer assemblies can also be assembled one above the other.

Different substances and materials can be used for coating the carrier material. Thus polymers, such as, for example, modified poly(vinyl alcohols), can be applied by means of suitable coating processes. The water vapor diffusion resistance, which is measured in accordance with DIN 52615, thereby varies by more than one power of ten between a dry environment and a damp one. However, dispersions of synthetic resins, methyl cellulose, linseed oil alkyd resin, bone glue or protein derivatives can also be used as a coating material for the carrier.

In the case where the carrier material is coated on one side, this coating can be applied to the side on which little or no protection is required against mechanical influences. The installation of the vapor barrier in accordance with the invention can take place in such a way in this case that the protective carrier material points toward the side facing the room or toward the side facing away from the room.

A vapor barrier in accordance with the invention can be formed from a film which comprises polyamide 6. Experiments were carried out with a film thickness of 50 μm. The polyamide 6 films that were used are currently manufactured by the MF-Folien GmbH firm in Kempten, Germany.

Hygroscopic Behavior in Laboratory Tests

The water vapor diffusion resistance of the humidity-adaptive vapor barrier was determined in accordance with DIN 52615 in the dry range (3/50% relative humidity (RH)) and in the damp range (50/93% RH) as well as in two damp ranges lying in between (33/50% and 50/75% RH). The result for the diffusion-equivalent air layer thickness ($s_d$ value) of the vapor barrier with a thickness of 50 μm is represented in FIG. 1 as a function of the average relative humidity which prevailed in the test. The difference between the $s_d$ value in the dry range and that in the damp range is more than one power of ten, so that under practical room air conditions—which range between 30% and 50% in winter and between approximately 60% and 70% in summer—it can be expected that the diffusion currents can be controlled significantly by the vapor barrier.

An Example of a Practical Application

As a result of the installation of full inter-rafter insulation made from mineral fiber which is 10 cm to 20 cm thick, computational studies have shown that high-pitched roofs with vapor-tight secondary roofs can become so damp within a few years that damage is unavoidable despite a vapor barrier facing the room. The situation is particularly critical with high room air humidity levels which vary, for example, from 50% RH in January to 70% RH in July while, at the same time, the short-wave radiation gain is relatively low via a northerly orientation. The influence of the humidity-adaptive vapor barrier on the long-term moisture balance of such constructions under the climatic conditions of Holzkirchen has therefore been estimated computationally below with the help of a method which has already been verified several times in experiments.

Figure 2:
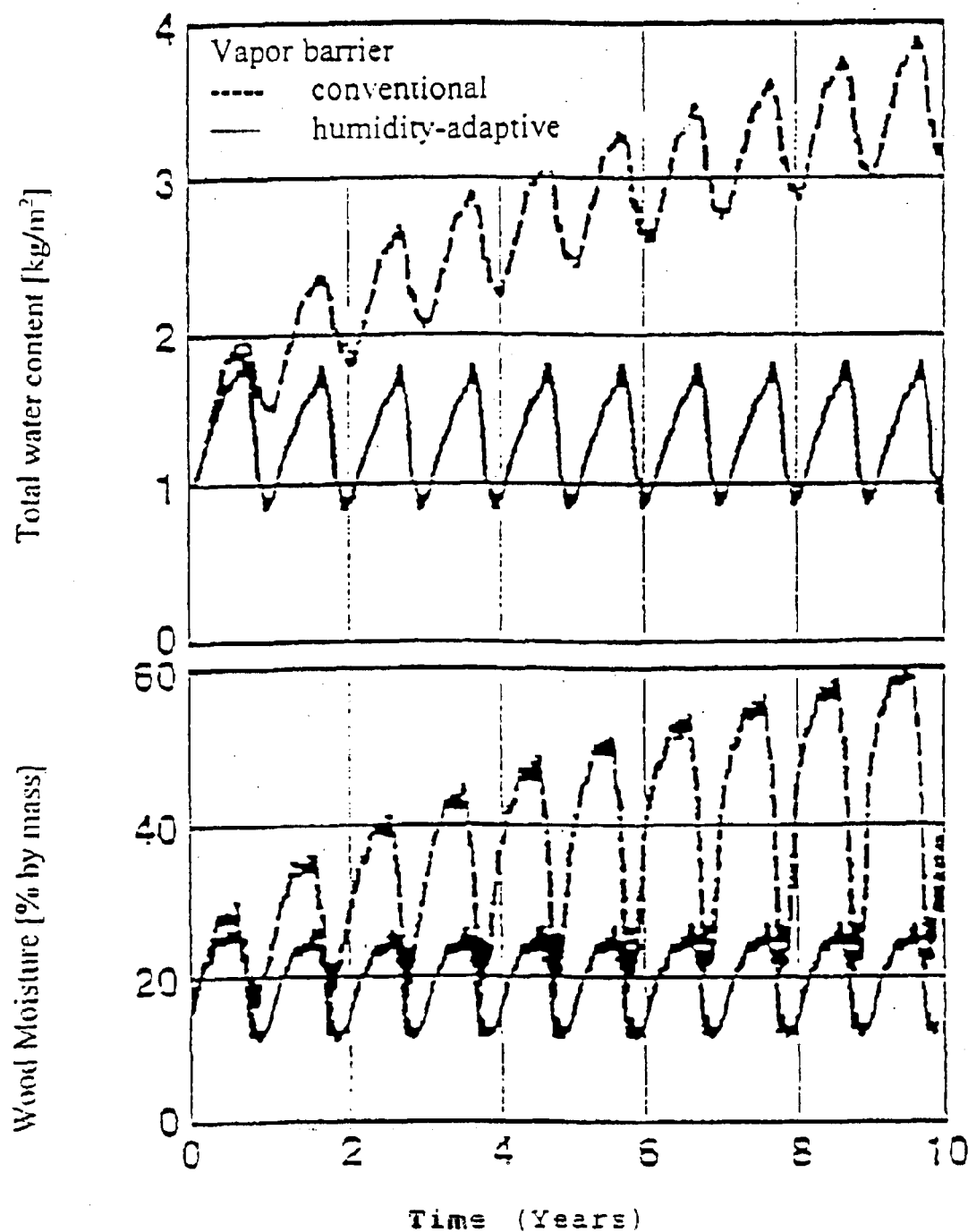

The humidity characteristics following the installation of inter-rafter insulation with a traditional vapor barrier and with the humidity-adaptive vapor barrier facing the room are shown in FIG. 2 in the case of a non-insulated, high-pitched roof (28° pitch), which is oriented toward the north, with planking, bitumen-treated felt and a tile covering, whereby the roof is in hygroscopic equilibrium with its surroundings. The profile for the overall humidity in the roof is indicated in the upper part of this diagram and the profile for the moisture in the wood of the planks is indicated in the lower part of this diagram, whereby these are over a period of ten years. The humidity in the roof with the traditional vapor barrier increases rapidly with seasonal fluctuations, whereby moisture values (>20% by mass) in the wood, which would give cause for concern on a long-term basis, already occur in the first year; by contrast, no moisture accumulation can be detected in the roof with the humidity-adaptive vapor barrier. In the summer, the moisture in the wood in this case is constantly below 20% by mass so that moisture damage does not need to be feared.

Thus the humidity-adaptive vapor barrier opens up the possibility of inexpensively insulating high-pitched roofs on old buildings with no great risk of damage.

We claim:

1. A wall of a building, comprising a film attached to the wall of the building, wherein the film has a water vapor diffusion resistance ($s_d$-value) at a relative humidity of an atmosphere surrounding the vapor retarder in the region of 30% to 50% of 2 to 5 meters diffusion-equivalent air layer thickness, and, at a relative humidity in the region of 60% to 80% which is <1 meter diffusion-equivalent air layer thickness.

2. The wall of the building according to claim 1, which further comprises a carrier material attached to the film.

3. The wall of the building according to claim 2, wherein the carrier material has a water vapor diffusion resistance which is less than the water vapor diffusion resistance of the film.

4. The wall of the building according to claim 2, wherein the carrier material is selected from the group consisting of particle board, chip board, oriented strand board, plywood paneling, gypsum board, fiber reinforced gypsum board, fiber board, cement board, cementitious wood wool board, calcium silica board, fiber insulation batts, fiber insulation slabs, foam insulation slabs, wall paper, and cloth.

5. The wall of the building according to claim 2, wherein the carrier material is a fiber-reinforced cellulose material.

6. The wall of the building according to claim 1, further comprising at least two layers of a carrier material, wherein the film is sandwiched between two layers of carrier material, the two layers of carrier material having a water vapor diffusion resistance which is less than the water vapor diffusion resistance of the film.

7. The wall of the building according to claim 1, wherein the film comprises polyamide.

8. The wall of the building according to claim 7, wherein the polyamide is selected from the group consisting of polyamide 6, polyamide 4, and polyamide 3.

9. The wall of the building according to claim 8, wherein the polyamide is polyamide 6.

10. The wall of the building according to claim 1, wherein the film has a thickness of 10 $\mu$m to 2 mm.

11. The wall of the building according to claim 1, wherein the film has a thickness of 20 $\mu$m to 100 $\mu$m.

12. The wall of the building according to claim 1, wherein the film comprises a pattern.

13. The wall of the building according to claim 12, wherein the film comprises a printed color pattern.

14. A roof of a building, comprising a film attached to the roof of the building, wherein the film has a water vapor diffusion resistance ($s_d$-value) at a relative humidity of an atmosphere surrounding the vapor retarder in the region of 30% to 50% of 2 to 5 meters diffusion-equivalent air layer thickness, and, at a relative humidity in the region of 60% to 80% which is <1 meter diffusion-equivalent air layer thickness.

15. The roof of a building according to claim 14, which further comprises a carrier material attached to the film.

16. The roof of a building according to claim 15, wherein the carrier material has a water vapor diffusion resistance which is less than the water vapor diffusion resistance of the film.

17. The roof of a building according to claim 15, wherein the carrier material is selected from the group consisting of particle board, chip board, oriented strand board, plywood paneling, gypsum board, fiber reinforced gypsum board, fiber board, cement board, cementitious wood wool board, calcium silica board, fiber insulation batts, fiber insulation slabs, foam insulation slabs, wall paper, and cloth.

18. The roof of a building according to claim 15, wherein the carrier material is a fiber-reinforced cellulose material.

19. The roof of a building according to claim 14, further comprising at least two layers of a carrier material, wherein the film is sandwiched between two layers of carrier material, the two layers of carrier material having a water vapor diffusion resistance which is less than the water vapor diffusion resistance of the film.

20. The roof of a building according to claim 14, wherein the film comprises polyamide.

21. The roof of a building according to claim 20, wherein the polyamide is selected from the group consisting of polyamide 6, polyamide 4, and polyamide 3.

22. The roof of a building according to claim 21, wherein the polyamide is polyamide 6.

23. The roof of a building according to claim 14, wherein the film component has a thickness of 10 $\mu$m to 2 mm.

24. The roof of a building according to claim 14, wherein the film component has a thickness of 20 $\mu$m to 100 $\mu$m.

25. The roof of a building according to claim 14, wherein the film comprises a pattern.

26. The roof of a building according to claim 14, wherein the film comprises a printed color pattern.

27. The roof of a building according to claim 14, wherein the film is positioned between at least two rafters of said roof of the building.

28. A building structure comprising the wall of a building according to claim 1.

29. A building structure comprising the wall of a building according to claim 14.

30. A method of constructing a wall of a building, comprising applying to the wall, a film having a water vapor diffusion resistance ($s_d$-value) at a relative humidity of an atmosphere surrounding the vapor retarder in the region of 30% to 50% of 2 to 5 meters diffusion-equivalent air layer thickness, and, at a relative humidity in the region of 60% to 80% which is <1 meter diffusion-equivalent air layer thickness.

31. The method according to claim 30, wherein the film is attached to a carrier material.

32. The method according to claim 31, wherein the carrier material has a water vapor diffusion resistance which is less than the water vapor diffusion resistance of the film.

33. The method according to claim 31, wherein the carrier material is selected from the group consisting of particle board, chip board, oriented strand board, plywood paneling, gypsum board, fiber reinforced gypsum board, fiber board, cement board, cementitious wood wool board, calcium silica board, fiber insulation batts, fiber insulation slabs, foam insulation slabs, wall paper, and cloth.

34. The method according to claim 31, wherein the carrier material is a fiber-reinforced cellulose material.

35. The method according to claim 30, further comprising at least two layers of a carrier material, wherein the film is sandwiched between two layers of carrier material, the two layers of carrier material having a water vapor diffusion resistance which is less than the water vapor diffusion resistance of the film.

36. The method according to claim 30, wherein the film comprises polyamide.

37. The method according to claim 36, wherein the polyamide is selected from the group consisting of polyamide 6, polyamide 4, and polyamide 3.

38. The method according to claim 37, wherein the polyamide is polyamide 6.

39. The method according to claim 30, wherein the film component has a thickness of 10 $\mu$m to 2 mm.

40. The method according to claim 30, wherein the film component has a thickness of 20 $\mu$m to 100 $\mu$m.

41. The method according to claim 30, wherein the film comprises a pattern.

42. The method according to claim 30, wherein the film comprises a printed color pattern.

43. A method of constructing a roof of a building, comprising applying to the roof, a film having a water vapor diffusion resistance ($s_d$-value) at a relative humidity of an atmosphere surrounding the vapor retarder in the region of 30% to 50% of 2 to 5 meters diffusion-equivalent air layer thickness, and, at a relative humidity in the region of 60% to 80% which is <1 meter diffusion-equivalent air layer thickness.

44. The method according to claim 43, wherein the film is attached to a carrier material.

45. The method according to claim 44, wherein the carrier material has a water vapor diffusion resistance which is less than the water vapor diffusion resistance of the film.

46. The method according to claim 45, wherein the carrier material is selected from the group consisting of particle board, chip board, oriented strand board, plywood paneling, gypsum board, fiber reinforced gypsum board, fiber board, cement board, cementitious wood wool board, calcium silica board, fiber insulation batts, fiber insulation slabs, foam insulation slabs, wall paper, and cloth.

47. The method according to claim 44, wherein the carrier material is a fiber-reinforced cellulose material.

48. The method according to claim 43, further comprising at least two layers of a carrier material, wherein the film is sandwiched between two layers of carrier material, the two layers of carrier material having a water vapor diffusion resistance which is less than the water vapor diffusion resistance of the film.

49. The method according to claim 43, wherein the film comprises polyamide.

50. The method according to claim 49, wherein the polyamide is selected from the group consisting of polyamide 6, polyamide 4, and polyamide 3.

51. The method according to claim 50, wherein the polyamide is polyamide 6.

52. The method according to claim 43, wherein the film component has a thickness of 10 $\mu$m to 2 mm.

53. The method according to claim 43, wherein the film component has a thickness of 20 $\mu$m to 100 $\mu$m.

54. The method according to claim 43, wherein the film comprises a pattern.

55. The method according to claim 43, wherein the film comprises a printed color pattern.

56. The method according to claim 43, wherein the film is applied between at least two rafters of the roof.

57. The wall of the building according to claim 1, which further comprises an insulation material between the wall and said film.

58. The roof of a building according to claim 4, which further comprises an insulation material between the roof and said film.

59. The method according to claim 30, which further comprises installing an insulation material between the wall of a building and said film.

60. The method according to claim 43, which further comprises installing an insulation material between the roof of a building and said film.

61. A method of insulating a building, comprising installing a film component and an insulation material onto the building, wherein the film component has a water vapor diffusion resistance ($s_d$-value) at a relative humidity of an atmosphere surrounding the vapor retarder in the region of 30% to 50% of 2 to 5 meters diffusion-equivalent air layer thickness, and, at a relative humidity in the region of 60% to 80% which is <1 meter diffusion-equivalent air layer thickness.

62. The method of claim 61, wherein the film component is attached to a carrier material.

63. The method of claim 62, wherein the carrier material has a water vapor diffusion resistance which is less than the water vapor diffusion resistance of the film.

64. The method of claim 61, wherein the film component comprises polyamide.

65. The method of claim 64, wherein the polyamide is selected from the group consisting of polyamide 6, polyamide 4, and polyamide 3.

66. The method of claim 65, wherein the polyamide is polyamide 6.

67. The method of claim 61, wherein the film component has a thickness of 10 $\mu$m to 2 mm.

68. The method of claim 61, wherein the film component has a thickness of 20 $\mu$m to 100 $\mu$m.

69. The method of claim 61, wherein the installing the film comprises spraying or painting the film component onto the building.

70. The method of claim 61, wherein the film component is a formed film.

71. The method of claim 70, wherein the film component comprises polyamide.

72. The method of claim 71, wherein the polyamide is selected from the group consisting of polyamide 6, polyamide 4, and polyamide 3.

73. The method of claim 72, wherein the polyamide is polyamide 3.

74. The method of claim 70, wherein the thickness of the formed film is 10 $\mu$m to 2 mm.

75. The method of claim 70, wherein the thickness of the formed film is 20 $\mu$m to 100 $\mu$m.

76. The method of claim 70, wherein the formed film comprises a pattern.

77. The method of claim 70, wherein the formed film comprises a printed color pattern.

* * * * *

UNITED STATES PATENT AND TRADEMARK OFFICE
CERTIFICATE OF CORRECTION

PATENT NO. : 6,890,666 B2
DATED : May 10, 2005
INVENTOR(S) : Kunzel et al.

It is certified that error appears in the above-identified patent and that said Letters Patent is hereby corrected as shown below:

Title page,
Items [45] and [*] Notice, should read as follows:
-- [45] **Date of Patent: *May 10, 2005**

[*] Notice: Subject to any disclaimer, the term of this patent is extended or adjusted under 35 U.S.C. 154(b) by 0 days.

This Patent is subject to a terminal disclaimer. --

Signed and Sealed this

Twelfth Day of July, 2005

JON W. DUDAS
*Director of the United States Patent and Trademark Office*